(12) United States Patent
Liao et al.

(10) Patent No.: US 10,890,979 B2
(45) Date of Patent: Jan. 12, 2021

(54) CONTROLLING SYSTEM AND CONTROLLING METHOD FOR VIRTUAL DISPLAY

(71) Applicant: INDUSTRIAL TECHNOLOGY RESEARCH INSTITUTE, Hsinchu (TW)

(72) Inventors: Duan-Li Liao, Taichung (TW); Chia-Chang Li, Pingtung (TW); Wen-Hung Ting, Tainan (TW); Hian-Kun Tenn, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 75 days.

(21) Appl. No.: 15/959,665

(22) Filed: Apr. 23, 2018

(65) Prior Publication Data
US 2019/0324550 A1 Oct. 24, 2019

(51) Int. Cl.
*G06F 3/01* (2006.01)
*G06K 9/00* (2006.01)
(Continued)

(52) U.S. Cl.
CPC .............. *G06F 3/017* (2013.01); *G06F 3/013* (2013.01); *G06F 16/532* (2019.01);
(Continued)

(58) Field of Classification Search
CPC ........ G06F 3/017; G06F 16/532; G06F 3/013; G06K 9/00375
See application file for complete search history.

(56) References Cited

U.S. PATENT DOCUMENTS 8,836,768 B1 9/2014 Rafii et al.
10,092,480 B2 * 10/2018 Le ...................... A61H 15/0078
(Continued)

FOREIGN PATENT DOCUMENTS

CN 104850221 A 8/2015
CN 103955267 B 3/2017
(Continued)

OTHER PUBLICATIONS

Author Unknown, "A Survey of 3D Object Selection Techniques for Virtual Environments," Preprint submitted to Computer & Graphics, Nov. 20, 2012, pp. 1-18.
(Continued)

*Primary Examiner* — Sejoon Ahn
(74) *Attorney, Agent, or Firm* — Birch, Stewart, Kolasch & Birch, LLP (57) ABSTRACT

A controlling system and a controlling method for virtual display are provided. The controlling system for virtual display includes a visual line tracking unit, a space forming unit, a hand information capturing unit, a transforming unit and a controlling unit. The visual line tracking unit is used for tracking a visual line of a user. The space forming unit is used for forming a virtual display space according to the visual line. The hand information capturing unit is used for obtaining a hand location of the user's one hand in a real operation space. The transforming unit is used for transforming the hand location to be a cursor location in the virtual display space. The controlling unit is used for controlling the virtual display according to the cursor location.

21 Claims, 5 Drawing Sheets (51) Int. Cl.
   *G06F 16/532*   (2019.01)
   *G06T 7/13*     (2017.01)
(52) U.S. Cl.
   CPC ............ *G06K 9/00375* (2013.01); *G06T 7/13* (2017.01); *G06T 2207/30196* (2013.01)

(56) References Cited

U.S. PATENT DOCUMENTS

| | | | |
|---|---|---|---|
| 2002/0175897 A1 | 11/2002 | Pelosi | |
| 2005/0159916 A1* | 7/2005 | Anabuki | G06T 15/20 702/151 |
| 2006/0050069 A1* | 3/2006 | Okuno | G06F 3/04815 345/419 |
| 2009/0102845 A1* | 4/2009 | Takemoto | G06T 19/006 345/426 |
| 2011/0055720 A1* | 3/2011 | Potter | G06F 3/017 715/747 |
| 2011/0221672 A1 | 9/2011 | Osterhout et al. | |
| 2012/0287304 A1* | 11/2012 | Kutaragi | G06K 9/00201 348/231.99 |
| 2013/0328925 A1 | 12/2013 | Latta et al. | |
| 2014/0160001 A1 | 6/2014 | Kinnebrew et al. | |
| 2015/0178939 A1 | 6/2015 | Bradski et al. | |
| 2015/0205484 A1* | 7/2015 | Morishita | G02B 27/017 382/103 |
| 2017/0053452 A1* | 2/2017 | Arai | G06F 3/04842 |
| 2017/0262168 A1 | 9/2017 | Xu | |
| 2019/0179511 A1* | 6/2019 | Shimada | G06F 3/011 |

FOREIGN PATENT DOCUMENTS

| | | |
|---|---|---|
| CN | 106530926 A | 3/2017 |
| CN | 107430437 A | 12/2017 |
| TW | I502468 B | 10/2015 |
| TW | M537702 U | 3/2017 |
| TW | I610218 B | 1/2018 |

OTHER PUBLICATIONS

Deng et al., "Understanding the impact of multimodal interaction using gaze informed mid-air gesture control in 3D virtual objects manipulation," Int. J. Human-Computer Studies, vol. 105, 2017 (available online Apr. 27, 2017), pp. 68-80.

Kölsch et al., "Vision-Based Interfaces for Mobility," Proceedings of the First Annual International Conference on Mobile and Ubiquitous Systems: Networking and Services, 2004, 9 pages.

Park et al., "Defining Rules Among Devices in Smart Environment Using an Augmented Reality Headset," Urb-IoT, Tokyo, Japan, May 24-25, 2016, 4 pages.

* cited by examiner

CONTROLLING SYSTEM AND CONTROLLING METHOD FOR VIRTUAL DISPLAY

TECHNICAL FIELD

The disclosure relates in general to a controlling system and a controlling method for virtual display.

BACKGROUND

Along with the development in the interactive technology, various interactive display technologies such as virtual reality (VR), augmented reality (AR), substitutional reality (SR) and mixed reality (MR) are provided. The interactive display technology has been applied in some professional areas such as gaming, virtual shops, virtual offices, and virtual tour. The interactive display technology can also be used in areas such as education to provide a learning experience which is lively and impressive.

Conventional interactive display technology is normally operated through a user interface (UI). However, the user's hand often affects object recognition. In the conventional interactive display technology, the user cannot control the object at a remote end. The user normally needs to physically touch the user interface, and therefore has a poor user experience.

Moreover, according to the interactive display technology, virtual display should be infinitely extended. However, an effective cursor controlling method capable of concurrently controlling an object located afar and another object located nearby is still unavailable.

SUMMARY

The disclosure is directed to a controlling system and a controlling method for virtual display capable of controlling each object in an infinitely extended virtual display with a cursor by using a visual line tracking technology and a space transformation technology.

According to one embodiment, a controlling system for virtual display is provided. The controlling system for virtual display includes a visual line tracking unit, a space forming unit, a hand information capturing unit, a transforming unit and a controlling unit. The visual line tracking unit is used for tracking a visual line of a user. The space forming unit is used for forming a virtual display space according to the visual line. The hand information capturing unit is used for obtaining a hand location of the user's one hand in a real operation space. The transforming unit is used for transforming the hand location to be a cursor location in the virtual display space. The controlling unit is used for controlling the virtual display according to the cursor location.

According to another embodiment, a controlling method for virtual display is provided. The controlling method for virtual display includes following steps: tracking a visual line of a user; forming a virtual display space according to the visual line; obtaining a hand location of the user's one hand in a real operation space; transforming the hand location to be a cursor location in the virtual display space; and controlling the virtual display according to the cursor location.

The above and other aspects of the invention will become better understood with regard to the following detailed description of the preferred but non-limiting embodiment(s). The following description is made with reference to the accompanying drawings.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1:
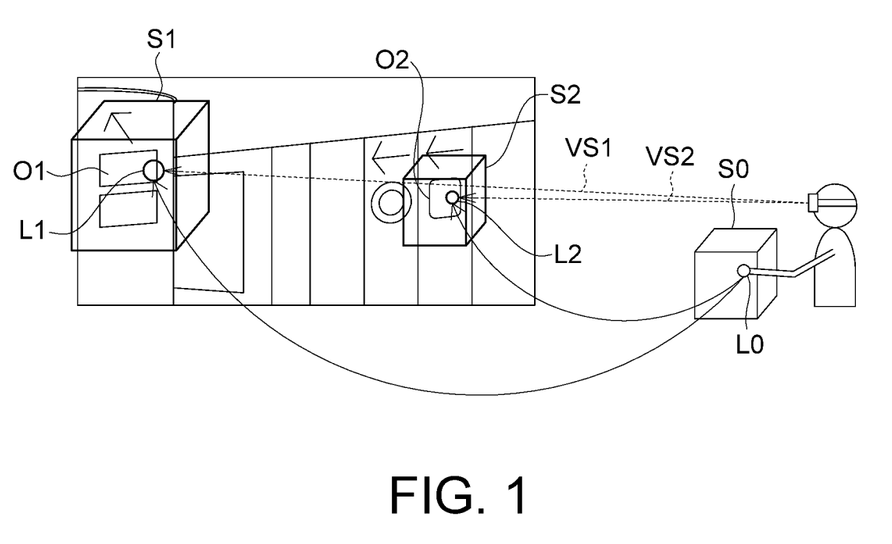
FIG. 1 is a schematic diagram of a controlling system for virtual display according to an embodiment

Referring to FIG. 1, a schematic diagram of a controlling system for virtual display 100 according to an embodiment is shown. The controlling system 100 can be realized by such as a head-mounted display, a smartphone, or a smart glasses. The controlling system 100 allows the user to operate in a real operation space S0. When a visual line VS1 of a user corresponds to an object O1, the user's operation in the real operation space S0 will correspond to a virtual display space S1 at a remote end. When the visual line VS2 of the user corresponds to an object O2, the user's operation in the real operation space S0 will correspond to a virtual display space S2 at the remote end.

To put it in greater details, a hand location L0 of the user' one hand in the real operation space S0 will correspond to a cursor location L1 (or a cursor location L2) in the virtual display space S1 (or the virtual display space S2) to control the virtual display according to the cursor location L1 (or the cursor location L2).

Figure 2:
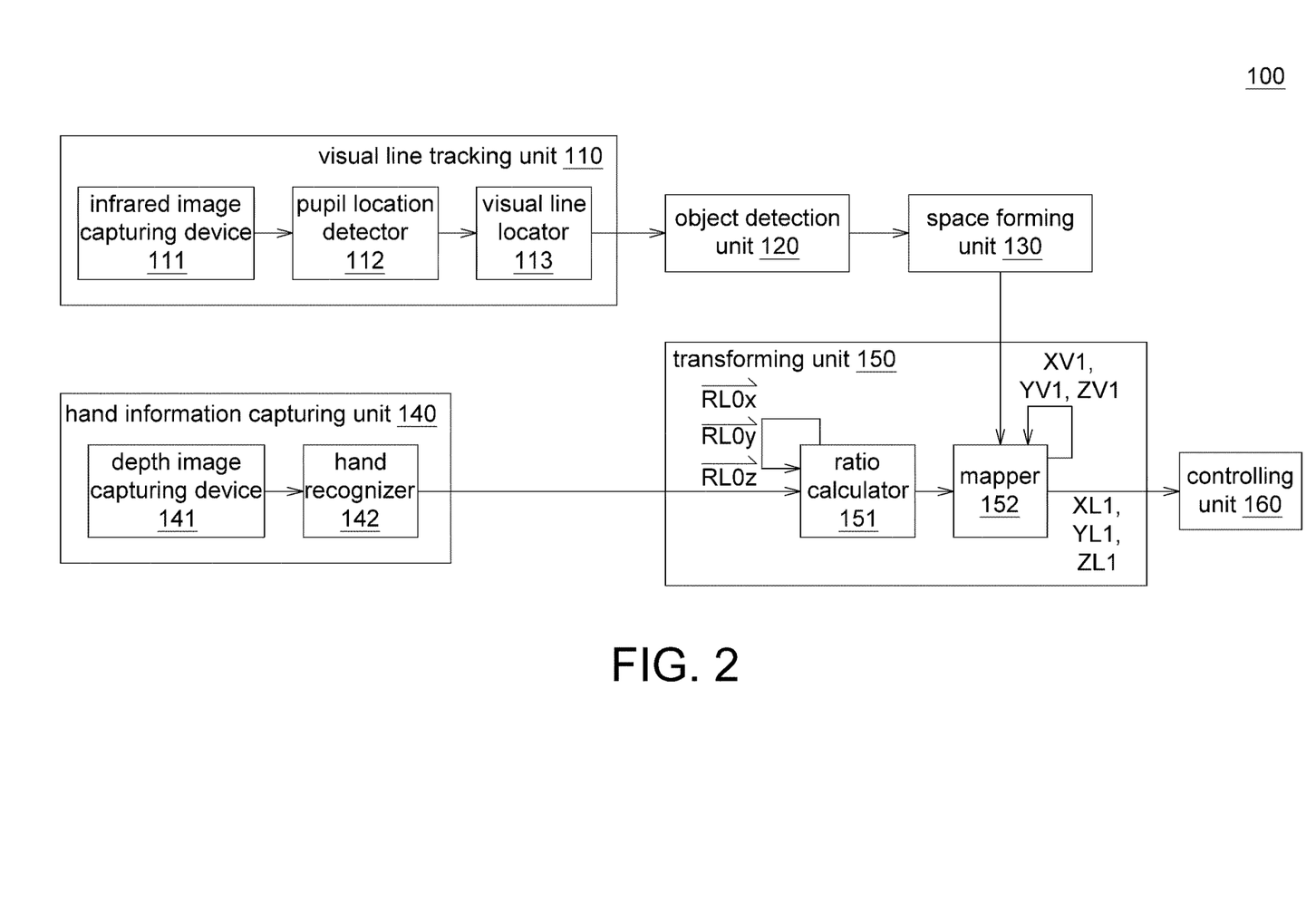
FIG. 2 is a block diagram of a controlling system.

Referring to FIG. 2, a block diagram of a controlling system 100 is shown. The controlling system 100 includes a visual line tracking unit 110, an object detection unit 120, a space forming unit 130, a hand information capturing unit 140, a transforming unit 150 and a controlling unit 160. The visual line tracking unit 110 is used for tracking the visual lines VS1 and VS2. The visual line tracking unit 110 can be formed of an infrared image capturing device 111, a pupil location detector 112 and a visual line locator 113.

The object detection unit 120 is used for detecting the objects O1 and O2. The space forming unit 130 is used for forming the virtual display spaces S1, S2. The hand information capturing unit 140 is used for capturing the hand location L0. The hand information capturing unit 140 can be realized by a combination of a depth image capturing device 141 and a hand recognizer 142.

The transforming unit 150 is used for transforming the hand location L0 to be cursor locations L1 and L2 The transforming unit 150 can be realized by a combination of a ratio calculator 151 and a mapper 152. The controlling unit 160 is used for controlling virtual display.

The visual line tracking unit 110, the object detection unit 120, the space forming unit 130, the hand information capturing unit 140, the transforming unit 150, and the controlling unit 160 can be realized by such as a chip, a circuit, a firmware, a circuit board, an electronic device or a recording device storing multiple programming codes. The operations of each element are disclosed below with a flowchart.

Figure 3:
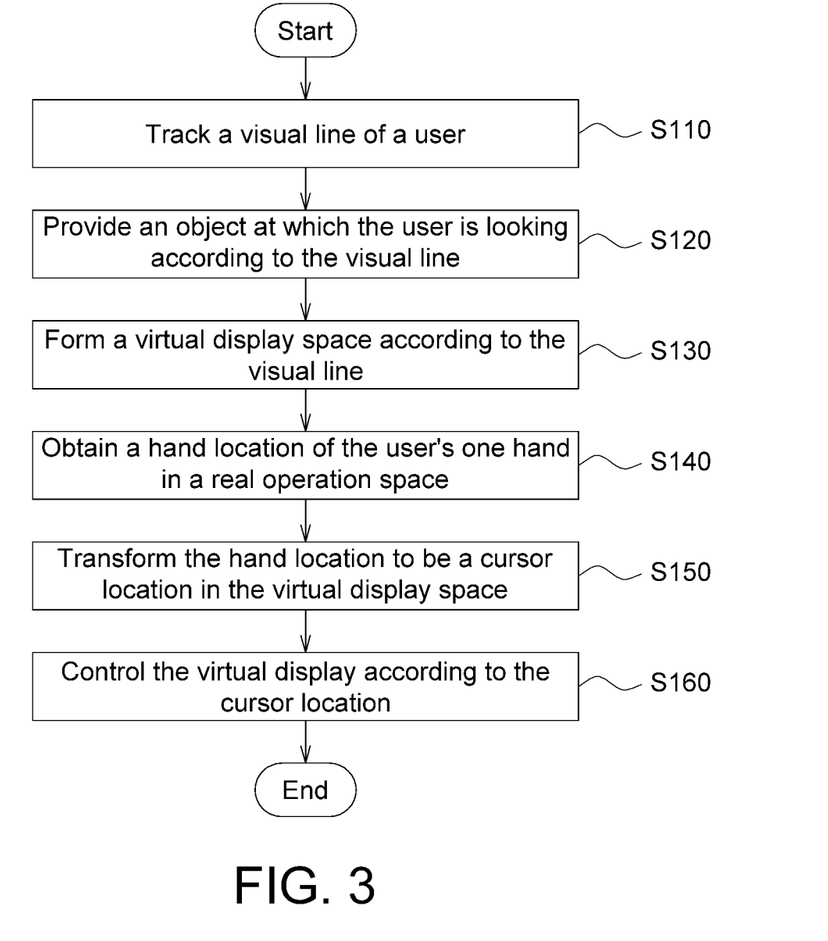
FIG. 3 is a flowchart of a controlling method for virtual display according to an embodiment.
Figure 4A:
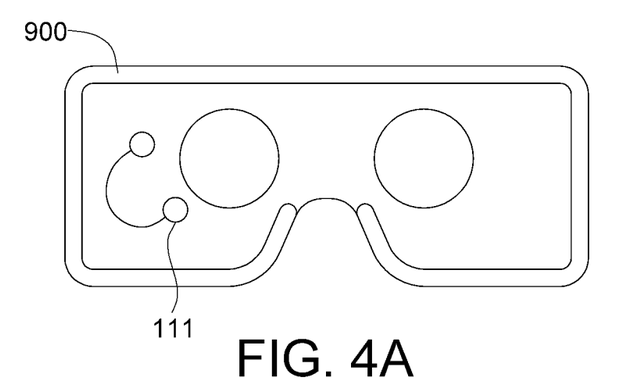
FIGS. 4A to 4C illustrates the operations of step S110.
Figure 4B:
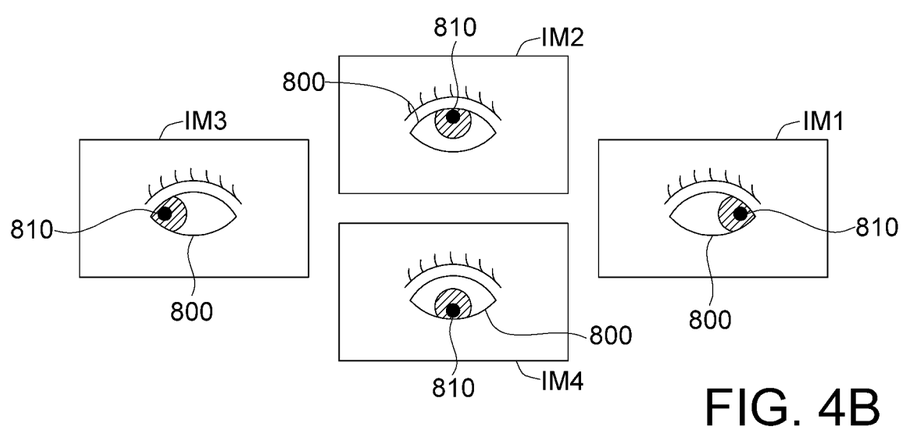
Figure 4C:
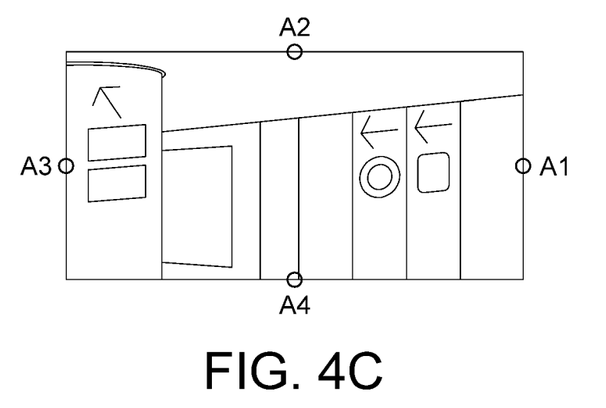

Referring to FIG. 3, a flowchart of a controlling method for virtual display according to an embodiment is shown. Firstly, the method begins at step S110, the visual line tracking unit 110 tracks a visual line VS1 (or a visual line VS2) of a user. Referring to FIGS. 4A to 4C, operations of step S110 are illustrated. As indicated in FIG. 4A, an infrared image capturing device 111 may be disposed in a head-mounted display 900. When the user wears the head-mounted display 900, the infrared image capturing device 111 immediately captures an image of an eye 800 (illustrated in FIG. 4B). As indicated in FIG. 4B, the pupil location detector 112 detects a location of a pupil 810 according to the infrared images IM1 to IM4 captured by the infrared image capturing device 111. The eye 800 of FIG. 4B is looking at the rightmost point A1, the topmost point A2, the leftmost point A3 and the bottommost point A4 of FIG. 4C, respectively. The visual line locator 113 recognizes the visual line of the user according to the location of the pupil 810.

Next, in step S120, the object detection unit 120 provides an object O1 (or an object O2) at which the user is looking according to the visual line VS1 (or the visual line VS2). In an embodiment, the object detection unit 120 detects the background image according to at least one contour line of the background by using an edge detection algorithm, and connects the at least one contour line to form the object O1 (or the object O2). Or, the object detection unit 120 searches a database to locate the object O1 (or the object O2) corresponding to the visual line VS1 (or the visual line VS2) according to the visual line VS1 (or the visual line VS2).

Then, in step S130, the space forming unit 130 forms a virtual display space S1 (or a virtual display space S2) according to the object O1 (or the object O2) corresponding to the visual line VS1 (or the visual line VS2). The sizes of the virtual display spaces S1 and S2 vary with the objects O1 and O2, but are irrelevant with the distances of the objects O1 and O2. For example, the object O1 is larger, so the virtual display space S1 is also larger; the object O2 is smaller, so the virtual display space S2 is smaller. Besides, the size of the real operation space S0 may be the same as or different from the size of the virtual display space S1 (or the virtual display space S2).

Moreover, the length/width/height ratio of the virtual display spaces S1 and S2 is not fixed but depends on the objects O1 and O2. In an embodiment, the step S120 can be omitted, and the virtual display space S1 (or the virtual display space S2) can be directly formed according to the visual line VS1 (or the visual line VS2).

Figure 5:
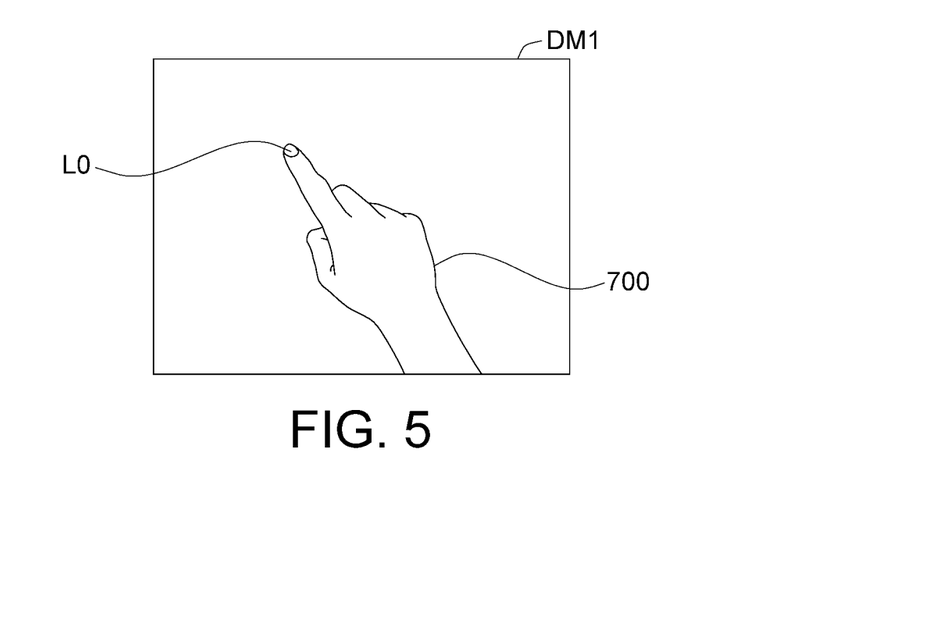
FIG. 5 illustrates the operations of step S140.

Then, in step S140, the hand information capturing unit 140 obtains a hand location L0 of the user's one hand 700 (illustrated in FIG. 5) in the real operation space S0. Referring to FIG. 5, operations of step S140 are illustrated. In step S140, the depth image capturing device 141 captures a depth image DM1 of the user. The hand recognizer 142 recognizes the hand 700 (illustrated in FIG. 5) from the depth image DM1 and positions the hand location L0 of the user's one hand 700.

Figure 6:
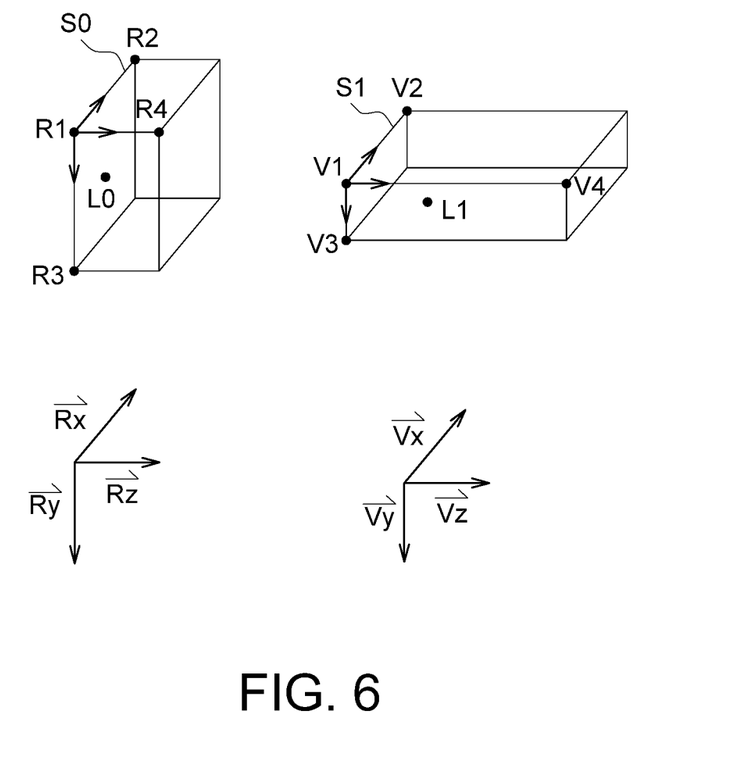
FIG. 6 illustrates the operations of step S150.

Then, in step S150, the transforming unit 150 transforms the hand location L0 to be a cursor location L1 (or a cursor location L2) in the virtual display space S1 (or the virtual display space S2). Referring to FIG. 6, operations of step S150 are illustrated. In FIG. 6, the cursor location L1 is used as an example. As indicated in FIG. 6, the real operation space S0 has a first operation axis $\vec{Rx}$, a second operation axis $\vec{Ry}$, and a third operation axis $\vec{Rz}$. The first operation axis $\vec{Rx}$ is a vector formed by point R1 and point R2. The second operation axis $\vec{Ry}$ is a vector formed by point R1 and point R3. The third operation axis $\vec{Rz}$ is a vector formed by point R1 and point R4. The hand location vector $\vec{RL0}$ is a vector formed by point R1 and the hand location L0.

The virtual display space S1 has a first display axis $\vec{Vx}$, a second display axis $\vec{Vy}$, and a third display axis $\vec{Vz}$. The first display axis $\vec{Vx}$ is a vector formed by point V1 and point V2. The second display axis $\vec{Vy}$ is a vector formed by point V1 and point V3. The third display axis $\vec{Vz}$ is a vector formed by point V1 and point V4. The cursor location vector $\vec{RL1}$ is a vector formed by point V1 and the cursor location L1.

The angle relationship among the first operation axis $\vec{Rx}$, the second operation axis $\vec{Ry}$, and the third operation axis $\vec{Rz}$ may be different from or the same as the angle relationship among the first display axis $\vec{Vx}$, the second display axis $\vec{Vy}$, and the third display axis $\vec{Vz}$. For example, the real operation space S0 may be a Cartesian coordinate system, and the virtual display space S1 may be a non-Cartesian coordinate system (that is, not every angle formed by two axes is a right angle).

In step S150, based on formulas (1) to (3), the ratio calculator 151 calculates a first relative ratio Xrate of the hand location L0 in the first operation axis $\vec{Rx}$, a second relative ratio Yrate of the hand location L0 in the second operation axis $\vec{Ry}$, and a third relative ratio Zrate of the hand location L0 in the third operation axis $\vec{Rz}$. The first hand projection vector $\vec{RL0x}$ is a projection vector of the hand location vector $\vec{RL0}$ in the first operation axis $\vec{Rx}$. The second hand projection vector $\vec{RL0y}$ is a projection vector of the hand location vector $\vec{RL0}$ in the second operation axis $\vec{Ry}$. The third hand projection vector $\vec{RL0z}$ is a projection vector of the hand location vector $\vec{RL0}$ in the third operation axis $\vec{Rz}$.

$$Xrate = \frac{|\vec{RL0x}|}{|\vec{Rx}|} \quad (1)$$

$$Yrate = \frac{|\vec{RL0y}|}{|\vec{Ry}|} \quad (2)$$

$$Zrate = \frac{|\vec{RL0z}|}{|\vec{Rz}|} \quad (3)$$

Based on formula (4), the mapper 152 calculates a first display coordinate XL1 of the hand location L0 corresponding to the first display axis $\vec{Vx}$ according to the first relative ratio Xrate, a second display coordinate YL1 of the hand location L0 corresponding to the second display axis $\vec{Vy}$ according to the second relative ratio Yrate, and a third display coordinate ZL1 of the hand location L0 in the third display axis $\vec{Vz}$ according to the third relative ratio Zrate. The point V1 has the first display coordinate XV1, the second display coordinate YV1, and the third display coordinate ZV1.

$$(XL1, YL1, ZL1) = (XV1, YV1, ZV1) + X\text{rate} * \vec{Vx} + Y\text{rate} * \vec{Vy} + Z\text{rate} * \vec{Vz} \quad (4)$$

Thus, the transforming unit 150 can transform the hand location L0 to be the cursor location L1 in the virtual display space S1.

Then, in step S160, the controlling unit 160 controls the virtual display according to the cursor location L1 (or the cursor location L2). During the control of virtual display, the movement of the cursor is adjusted according to the first relative ratio Xrate, the second relative ratio Yrate, and the third relative ratio Zrate. Thus, regardless of the objects O1 and O2 being located afar or nearby, the same effect can be generated as long as the operations performed in the real operation space S0 are of the same scale. For example, as indicated in FIG. 1, the user can slide his hand 700 for "a half-length" in the real operation space S0 to flip the object O2 located nearby by 90°. Similarly, the user can also can slide his hand 700 for "a half-length" in the real operation space S0 to flip the object O1 located afar by 90°. The two operations generate the same effect, and are not affected by the distances of the objects O1 and O2.

Similarly, during the operation of virtual display, the movement of the cursor is adjusted according to the first relative ratio Xrate, the second relative ratio Yrate, and the third relative ratio Zrate. Thus, regardless of the size of the objects O1 and O2, the same effect can be generated as long as the operations performed in the real operation space S0 are of the same scale. As indicated in FIG. 1, the user can slide his hand 700 for "a semi-circle" in the real operation space S0 to turn the object O2 which is smaller upside down. Similarly, the user can also slide his hand 700 for "a semi-circle" in the real operation space S0 to turn the object O1 which is bigger upside down. The two operations generate the same effect, and are not affected by the size of the object O1 and the size of the object O2.

Through the above steps, the user can use a cursor to control each object in an infinitely extended virtual display with a cursor by using a visual line tracking technology and a space transformation technology of the interactive display technologies.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A controlling system for virtual display, comprising:
    a visual line tracking circuit configured to track a visual line of a user, wherein the visual line tracking circuit includes a pupil location detector, the pupil location detector is configured to detect a location of a pupil according to an infrared image of an eye, the visual line is recognized according to a location of the pupil;
    a space forming circuit configured to form a virtual display space according to the visual line, wherein the virtual display space is changed with the visual line;
    a hand information capturing circuit configured to obtain a hand location of the user's one hand in a real operation space;
    a transforming circuit configured to transform the hand location to be a cursor location in the virtual display space, wherein the space forming circuit and the hand information capturing circuit are connected to the transforming circuit; and
    a controlling circuit configured to control the virtual display according to the cursor location.

2. The controlling system for virtual display according to claim 1, wherein the real operation space is a three-dimensional space; the virtual display space is a three-dimensional space.

3. The controlling system for virtual display according to claim 2, wherein the real operation space has a first operation axis, a second operation axis, and a third operation axis; the virtual display space has a first display axis, a second display axis, and a third display axis; the transforming circuit comprises:
    a ratio calculator configured to calculate a first relative ratio of the hand location in the first operation axis, a second relative ratio in the second operation axis, and a third relative ratio in the third operation axis; and
    a mapper configured to calculate a first display coordinate of the hand location in the first display axis according to the first relative ratio, a second display coordinate of the hand location in the second display axis according to the second relative ratio, and a third display coordinate of the hand location in the third display axis according to the third relative ratio.

4. The controlling system for virtual display according to claim 3, wherein an angle relationship among the first display axis, the second display axis, and the third display axis is different from an angle relationship among the first operation axis, the second operation axis, and the third operation axis.

5. The controlling system for virtual display according to claim 3, wherein an angle relationship among the first display axis, the second display axis, and the third display axis is the same as an angle relationship among the first operation axis, the second operation axis, and the third operation axis.

6. The controlling system for virtual display according to claim 1, wherein a size of the real operation space is different from a size of the virtual display space.

7. The controlling system for virtual display according to claim 1, wherein a size of the real operation space is the same as a size of the virtual display space.

8. The controlling system for virtual display according to claim 1, further comprising:
    an object detection circuit configured to provide an object at which the user is looking according to the visual line.

9. The controlling system for virtual display according to claim 8, wherein the space forming circuit forms the virtual display space according to the object.

10. The controlling system for virtual display according to claim 8, wherein the object detection circuit detects at least one contour line by using an edge detection algorithm and connects the at least one contour line to form the object.

11. The controlling system for virtual display according to claim 8, wherein the object detection circuit searches a database to provide the object corresponding to the visual line.

12. A controlling method for virtual display, comprising:
tracking a visual line of a user;
forming a virtual display space according to the visual line, wherein the virtual display space is changed with the visual line, an infrared image of an eye is captured, a location of a pupil detected according to the infrared image, and the visual line is recognized according to a location of the pupil;
obtaining a hand location of the user's one hand in a real operation space;
transforming the hand location to be a cursor location in the virtual display space; and
controlling the virtual display according to the cursor location.

13. The controlling method for virtual display according to claim 12, wherein the real operation space is a three-dimensional space; the virtual display space is a three-dimensional space.

14. The controlling method for virtual display according to claim 13, wherein the real operation space has a first operation axis, a second operation axis and a third operation axis; the virtual display space has a first display axis, a second display axis and a third display axis; the step of transforming the hand location to be the cursor location in the virtual display space comprises:
calculating a first relative ratio of the hand location in the first operation axis, a second relative ratio in the second operation axis, and a third relative ratio in the third operation axis; and
calculating a first display coordinate of the hand location in the first display axis according to the first relative ratio, a second display coordinate of the hand location in the second display axis according to the second relative ratio, and a third display coordinate of the hand location in the third display axis according to the third relative ratio.

15. The controlling method for virtual display according to claim 14, wherein an angle relationship among the first display axis, the second display axis, and the third display axis is different from an angle relationship among the first operation axis, the second operation axis, and the third operation axis.

16. The controlling method for virtual display according to claim 14, wherein an angle relationship among the first display axis, the second display axis, and the third display axis is the same as an angle relationship among the first operation axis, the second operation axis, and the third operation axis.

17. The controlling method for virtual display according to claim 12, wherein a size of the real operation space is different from a size of the virtual display space.

18. The controlling method for virtual display according to claim 12, wherein a size of the real operation space is the same as a size of the virtual display space.

19. The controlling method for virtual display according to claim 12, further comprising:
providing an object at which the user is looking according to the visual line.

20. The controlling method for virtual display according to claim 19, wherein the step of providing the object at which the user is looking according to the visual line comprises:
detecting at least one contour line by using an edge detection algorithm; and
connecting the at least one contour line to form the object.

21. The controlling method for virtual display according to claim 19, wherein the step of providing the object at which the user is looking according to the visual line comprises:
searching a database; and
searching the database to provide the object corresponding to the visual line.

\* \* \* \* \*